United States Patent
Park

(10) Patent No.: US 9,153,951 B2
(45) Date of Patent: Oct. 6, 2015

(54) APPARATUS FOR DETECTING SURGE VOLTAGE AND METHOD THEREOF

(71) Applicant: LSIS CO., LTD., Anyang-si, Gyeonggi-do (KR)

(72) Inventor: Changwoo Park, Cheonan-si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 2 days.

(21) Appl. No.: 14/080,650

(22) Filed: Nov. 14, 2013

(65) Prior Publication Data

US 2014/0185172 A1    Jul. 3, 2014

(30) Foreign Application Priority Data

Jan. 2, 2013    (KR) .................. 10-2013-0000170

(51) Int. Cl.
    *H02H 3/22*    (2006.01)
    *H02H 3/04*    (2006.01)
    *H02H 9/04*    (2006.01)

(52) U.S. Cl.
    CPC ............... *H02H 3/04* (2013.01); *H02H 9/043* (2013.01); *H02H 9/046* (2013.01)

(58) Field of Classification Search
    USPC ........................................... 361/117
    See application file for complete search history.

(56) References Cited

U.S. PATENT DOCUMENTS

| | | | | | |
|---|---|---|---|---|---|
| 2,850,650 | A | * | 9/1958 | Meacham | 327/309 |
| 3,246,206 | A | * | 4/1966 | Chowdhuri | 361/91.5 |
| 5,166,854 | A | * | 11/1992 | Morishige | 361/91.6 |
| 5,561,596 | A | * | 10/1996 | Hemena et al. | 363/50 |
| 2006/0232906 | A1 | * | 10/2006 | Sueoka | 361/118 |
| 2007/0002512 | A1 | * | 1/2007 | Schonenberger | 361/118 |
| 2009/0310273 | A1 | * | 12/2009 | Chang | 361/117 |
| 2012/0250205 | A1 | * | 10/2012 | Pfitzer et al. | 361/91.1 |
| 2014/0185172 | A1 | * | 7/2014 | Park | 361/86 |
| 2014/0334047 | A1 | * | 11/2014 | Ahn | 361/56 |

* cited by examiner

*Primary Examiner* — Ronald W Leja
(74) *Attorney, Agent, or Firm* — Lee, Hong, Degerman, Kang & Waimey

(57) ABSTRACT

An apparatus for detecting surge voltage and a method thereof are proposed, by which a surge voltage can be detected to prevent damage to output parts by using a shunt regulator, when a surge voltage exceeding a maximum voltage limitable by a zener diode is applied, and trouble shooting and system maintenance/repair of a system can be more effectively performed, the apparatus including a voltage distributor configured to output a driving voltage, when an applied surge voltage exceeds a reference surge voltage, a signal output unit configured to generate an output signal by being driven by a driving voltage outputted by the voltage distributor, and a surge voltage detection signal output unit configured to output a surge voltage detection signal indicating that a surge voltage exceeding the reference surge voltage in response to a signal outputted by the signal output unit.

8 Claims, 3 Drawing Sheets

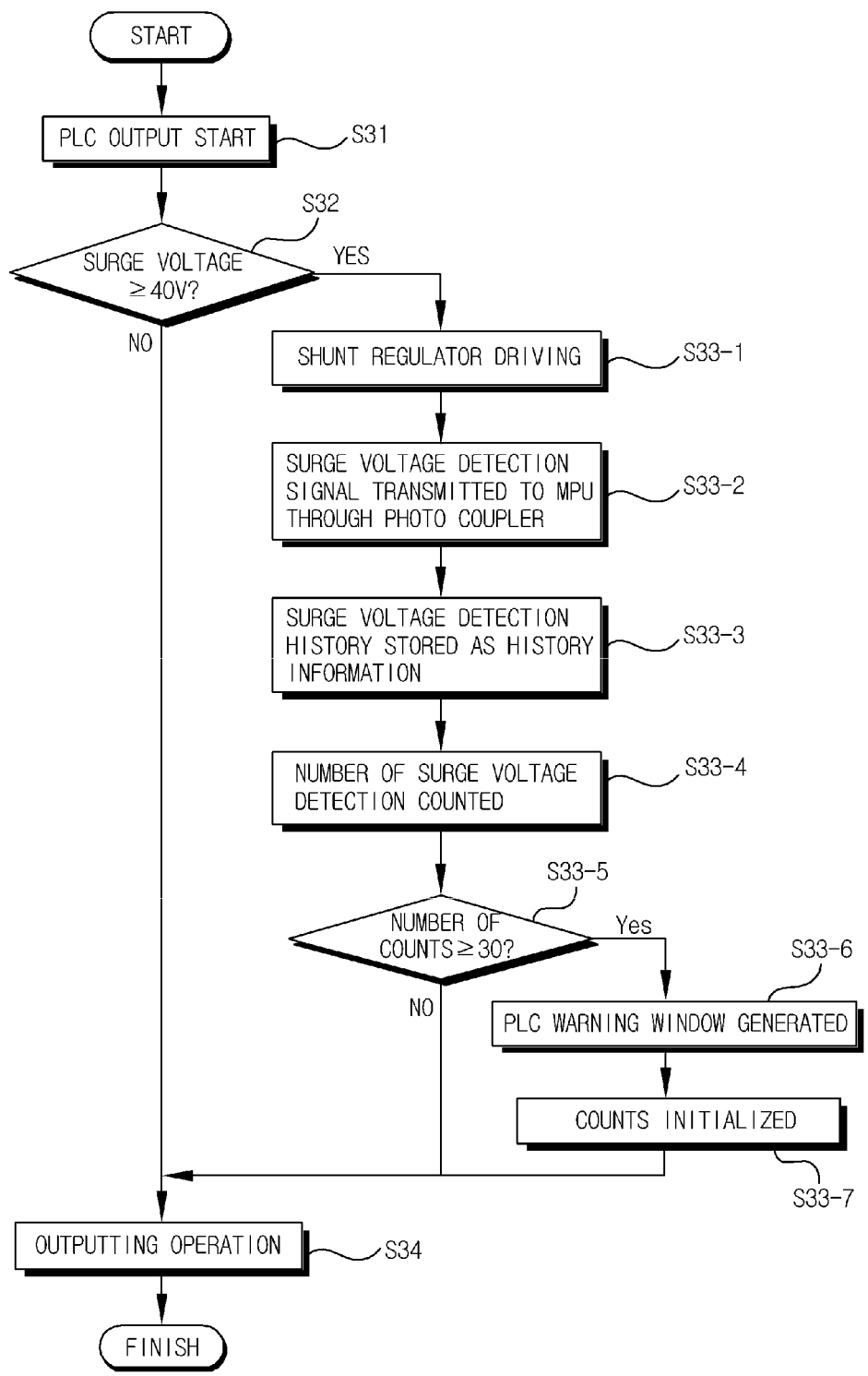

APPARATUS FOR DETECTING SURGE VOLTAGE AND METHOD THEREOF

CROSS-REFERENCE TO RELATED APPLICATION

Pursuant to 35 U.S.C. §119(a), this application claims the benefit of earlier filing date and right of priority to Korean Patent Application No. 10-2013-0000170, filed on Jan. 2, 2013, the contents of which are hereby incorporated by reference herein in their entirety.

BACKGROUND OF THE DISCLOSURE

1. Field of the Disclosure

Exemplary aspects of the present disclosure relate to an apparatus for detecting surge voltage and a method thereof, and more particularly, to an apparatus for detecting surge voltage configured to efficiently perform a trouble shooting of parts and maintenance/repair of a system by detecting a surge voltage using a shunt regulator, and a method using the apparatus.

2. Description of Related Art

A variety of methods across an entire industrial field are used to protect various products from surge voltages. To be more specific, a PLC (Programmable Logic Controller) provides various functions of such as, but not limited to, digital input/output, analog input/output, communications, position determining and high speed counter. The digital input/output is one of the most frequently used functions among the variety of functions. Hence, the digital input/output takes the highest rate in field claims, and particularly, parts damage is most frequently generated due to surge voltages inputted to a DC output terminal.

FIG. 1 is a schematic circuit configuration of a DC output module in a PLC according to prior art.

Referring to FIG. 1, the DC output module transmits an MPU (Micro Processing Unit) output signal to an output driving transistor (TR) using a photo coupler (PC1) and facilitates a stable output by limiting a surge voltage through a zener diode (ZD). A DC output is turned on or off according to a program prepared by a PADT (Programming and Debugging Tool), and a load, which is an external device used by a user, is connected to a power source (15) of a predetermined voltage (e.g., 24V).

The photo coupler (PC1) is driven when a DC output is applied through an MPU (Micro Processing Unit), whereby an output signal of the photo transistor is transmitted to the output driving transistor (TR). As a result, the output driving transistor (TR) is turned on to realize an output operation, in which a current flows from the power source (15) along the load (14). At this time, a zener diode (ZD) was conventionally used to limit a surge voltage. However, parts are frequently damaged to result in a product defect, when a surge voltage (e.g., 40V) is applied for a long time that exceeds a maximum voltage (e.g., 38.7V) limitable by the zener diode (ZD).

SUMMARY OF THE INVENTION

Exemplary aspects of the present disclosure are to substantially solve at least the above problems and/or disadvantages according to prior art, and to provide at least the advantages as mentioned below. Thus, the present disclosure is directed to provide an apparatus for detecting surge voltage configured to prevent parts damage caused by surge voltages by efficiently detecting the surge voltages using a shunt regulator, and a method thereof.

Technical problems to be solved by the present disclosure are not restricted to the above-mentioned descriptions, and any other technical problems not mentioned so far will be clearly appreciated from the following description by skilled in the art.

In one general aspect of the present invention, there is provided an apparatus for detecting surge voltage, the apparatus comprising:
a voltage distributor configured to output a driving voltage, when an applied surge voltage exceeds a reference surge voltage;
a signal output unit configured to generate an output signal by being driven by a driving voltage outputted by the voltage distributor; and
a surge voltage detection signal output unit configured to output a surge voltage detection signal indicating that a surge voltage exceeding the reference surge voltage in response to a signal outputted by the signal output unit.

Preferably, but not necessarily, the voltage distributor may serially connect a voltage distribution resistor element (R1) to a resistor element (R2) between two contacts configured to detect a surge voltage, and applies a driving voltage to the signal output unit through a common contact between the resistor elements R1 and R2, when a surge voltage exceeding a reference surge voltage is applied.

Preferably, but not necessarily, the signal output unit may serially connect a current limiting resistor element (R3) and a shunt regulator to between two contacts configured to detect a surge voltage, where the shunt regulator is connected to the voltage distributor.

Preferably, but not necessarily, the surge voltage detection signal output unit may be a photo coupler.

Preferably, but not necessarily, the apparatus may further comprise a reference surge voltage limiter configured to limit the reference surge voltage.

Preferably, but not necessarily, the reference surge voltage limiter may include a zener diode connected between two contacts configured to detect the applied surge voltage.

Preferably, but not necessarily, the apparatus may further comprise a computing unit configured to store surge voltage generation information in response to a surge voltage detection signal outputted by a surge voltage detection signal output unit and to send a warning to a user that a surge voltage exceeding a reference is generated if a count value exceeds a predetermined count by counting the generation of the surge voltage exceeding the reference surge voltage.

In another general aspect of the present invention, there is provided a method for detecting surge voltage, the method comprising:
determining whether an applied surge voltage exceeds a reference surge voltage; driving a shunt regulator by generating a driving voltage when the applied surge voltage exceeds the reference surge voltage as a result of the determination; and outputting a surge voltage detection signal indicating that a surge voltage exceeding the reference surge voltage is detected in response to the driving of the shunt regulator.

Preferably, but not necessarily, the output of the surge voltage detection signal may use a photo coupler configured to operate in response to the driving of the shunt regulator.

Preferably, but not necessarily, the method may further comprise limiting intensity of the reference surge voltage among intensities of applied surge voltages using a zener diode.

Preferably, but not necessarily, the method may further comprise: storing surge voltage generation information in response to the surge voltage detection signal outputted in the step of outputting the surge voltage detection signal; determining whether a count value exceeds a predetermined count by counting the generation of a surge voltage exceeding the reference surge voltage; and enabling a user to check a warning that a surge voltage exceeding the reference surge voltage is generated, when a surge voltage detection count value exceeds a predetermined count.

In an advantageous effect of the apparatus for detecting surge voltage and the method thereof according to the present disclosure, a surge voltage can be detected to prevent damage to output parts by using a shunt regulator, when a surge voltage exceeding a maximum voltage limitable by a zener diode is applied.

Another advantageous effect is that trouble shooting and system maintenance/repair can be more effectively performed by reversely tracing a surge voltage-applied situation through management and configuration of a history in which a surge voltage is generated.

BRIEF DESCRIPTION OF THE DRAWINGS

FIG. 3 is an operational flowchart illustrating a method for detecting a surge voltage according to the present disclosure.

DETAILED DESCRIPTION OF PREFERRED EMBODIMENTS

Figure 1:
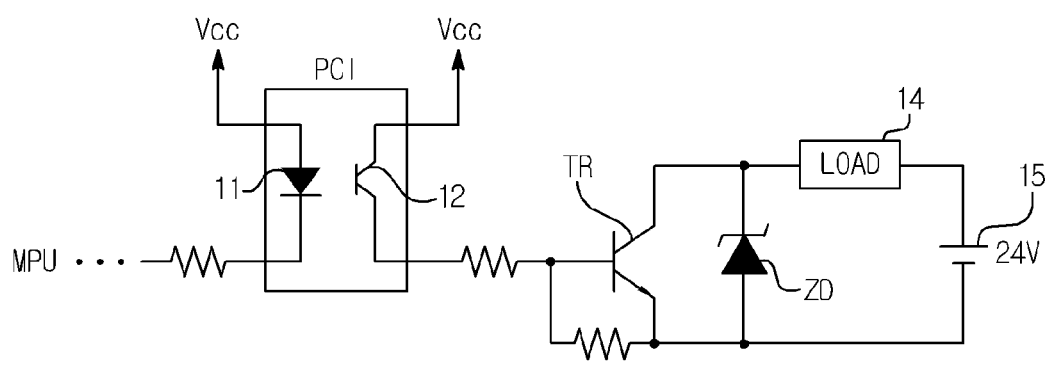
FIG. 1 is a schematic circuit configuration of a DC output module in a PLC according to prior art.

The present disclosure is herein described, by way of example only, with reference to the accompanying drawings. The present disclosure is presented in the cause of providing what is believed to be the most useful and readily understood description of the principles and conceptual aspects of the disclosure. In this regard, no attempt is made to show structural details of the invention in more detail than is necessary for a fundamental understanding of the disclosure and the description is taken with the drawings making apparent to those skilled in the art how the several forms of the invention may be embodied in practice.

Now, exemplary embodiments of the present disclosure will be described in detail with reference to the accompanying drawings, where the like reference numerals will be assigned to the like elements in the explanations of some figures.

Figure 2:
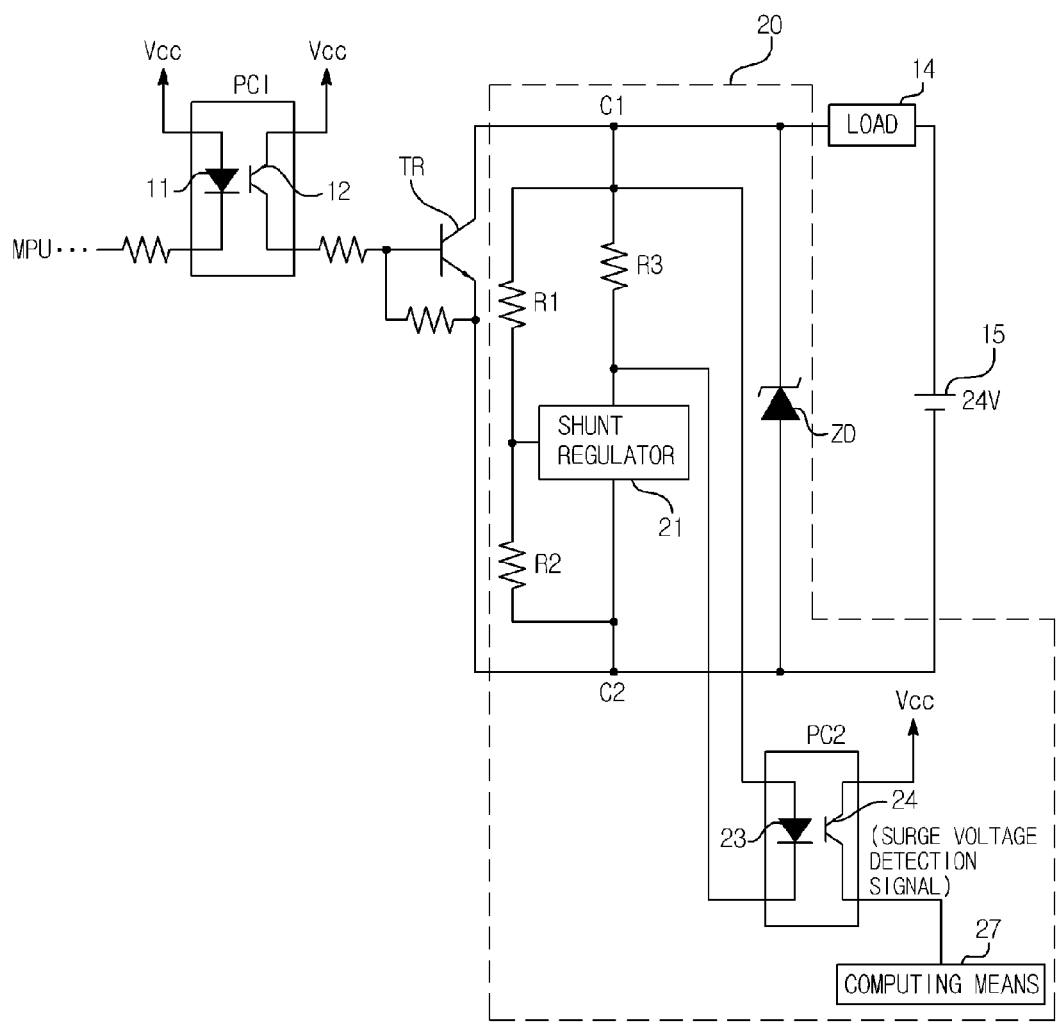
FIG. 2 is a schematic circuit configuration of an apparatus for detecting a surge voltage according to the present disclosure.

FIG. 2 is a schematic circuit configuration of an apparatus for detecting a surge voltage according to the present disclosure, where the apparatus is applied to a DC output module of PLC.

An apparatus for detecting a surge voltage (20, hereinafter referred to as an apparatus) basically may include a voltage distribution resistor element R1, a resistor element R2, a current limiting resistor element R3, a shunt regulator (21), a photo coupler (PC2) and a zener diode (ZD), where the shunt regulator (21) is a regulator configured to be driven by a reference voltage 2.5V, for example.

The voltage distribution resistor element R1 and the resistor element R2 are serially connected between two contacts (C1, C2), and supply a reference voltage to the shunt regulator (21) when a surge voltage exceeding a predetermined size (e.g., 40V) is generated. At this time, a voltage applied to the common contact of the resistor element R1 and the resistor element R2 is a reference voltage supplied to the shunt regulator (21).

For example, assuming that the shunt regulator (21) is driven by the reference voltage of 2.5V in order to detect a surge voltage exceeding 40V, a resistor value of the resistor element R1 and a resistor value of the resistor element R2 must be configured to satisfy the following Equation 1.

$$40\text{ V} \times \frac{\text{resistor value of } R2}{\text{resistor value of } R1 + \text{resistor value of } R2} = 2.5\text{ V} \quad \text{[Equation 1]}$$

Furthermore, the current limiting resistor element R3 and the shunt regulator (21) are serially connected between two contacts (C1, C2) configured to detect a surge voltage. An input terminal of the photo coupler (PC2) is connected to each end of the resistor element R3, and the photo coupler (PC2) serves to output a surge voltage detection signal notifying that a surge voltage has been generated.

That is, the shunt regulator (21) is turned on, when a surge voltage exceeding a predetermined size (e.g., 40V) is generated, to turn on a photo diode (23) of the photo coupler (PC2). Furthermore, a surge voltage detection signal is outputted to an output terminal as a photo transistor (24) of the photo coupler (PC2) is turned on in response to the turn-on of the photo diode (23).

The zener diode (ZD) is connected between two contacts (C1, C2) configured to detect a surge voltage, whereby a DC output module can be protected, when a surge voltage of maximum voltage limitable by itself is generated. If a surge voltage exceeding the maximum voltage limitable by the zener diode (ZD) is generated, the shunt regulator (21) is driven to output a surge voltage detection signal through the photo coupler (PC2).

The apparatus (20) may further comprise a computing means (27) configured to record a history, in which a surge voltage is generated, by receiving the surge voltage detection signal outputted by the photo coupler (PC2), and to generate an alarm in response to the history of the generated surge voltage.

The computing means (27) may be variably configured. By way of detailed example, the computing means (27) may be configured using a micro processor, and in case of a DC output module for PLC, an MPU (Micro Processor Unit) may serve as the computing means.

The method and condition for generating an alarm may be variably configured as occasion arises. For example, alarm may be generated, when the number of counts of the surge voltage detection signals exceeds a predetermined number of counts, and may be provided to a user through a visual display device.

Now, a method for detecting a surge voltage according to the present disclosure corresponding to an operation of the apparatus for detecting a surge voltage according to the present disclosure will be described with reference to FIG. 3.

FIG. 3 is an operational flowchart illustrating a method for detecting a surge voltage according to the present disclosure.

Referring first to FIG. 3, when a DC output (S31) is turned on using a program prepared at the PADT (Programming and Debugging Tool) by a user, a photo coupler (PC1) is turned on and an output driving transistor (TR) is turned on to perform an output operation (S34).

If a surge voltage exceeding a predetermined voltage (e.g., a surge voltage over 40V) is applied in the midst of the output operation (S32), a voltage distributed by the resistor elements R1 and R2 becomes a reference voltage (e.g., 2.5V) for driving the shunt regulator (21) to drive the shunt regulator (21), whereby a current flows through the current limiting resistor element R3 and the shunt regulator (21) (S33-1).

When the shunt regulator (21) is driven, the photo diode (23) of the photo coupler (PC2) is turned on and a photo transistor (24) is also turned on, whereby a surge voltage detection signal is outputted to the computing means (27, MPU) (S33-2).

The computing means (27) stores the surge voltage detection information in response to an output signal of the photo coupler (PC2) (33-3), and counts the number of the generated surge voltages (S33-4).

When the number of counts of generated surge voltages at a particular contact exceeds a predetermined reference number of count (e.g., 30 counts) (S33-5), an alarm message is outputted (S33-6) to a PLC warning window, notifying that a surge voltage exceeding a predetermined number of counts has occurred at a relevant contact, where the counts of generated surge voltages are initialized and the operation of detecting the surge voltages is continuously performed (S33-7).

Although exemplary embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

What is claimed is:

1. An apparatus for detecting surge voltage, the apparatus comprising:
   a voltage distributor configured to generate a driving voltage when an applied surge voltage exceeds a reference surge voltage;
   a signal output unit configured to generate an output signal when driven by the generated driving voltage, the signal output unit comprising a current limiting resistor element and a shunt regulator serially connected between two contacts configured to detect the applied surge voltage; and
   a surge voltage detection signal output unit configured to output a surge voltage detection signal indicating that the applied surge voltage exceeds the reference surge voltage in response to the output signal from the signal output unit, the surge voltage detection signal output unit a photo coupler connected directly across and in parallel with the current limiting resistor element,
   wherein the shunt regulator is connected in parallel with the voltage distributor.

2. The apparatus of claim 1, wherein the voltage distributor serially connects a voltage distribution resistor element to a resistor element between the two contacts and applies the driving voltage to the signal output unit via a common contact between the distribution resistor element and resistor element when the applied surge voltage exceeds the reference surge voltage.

3. The apparatus of claim 1, further comprising a reference surge voltage limiter configured to limit the reference surge voltage.

4. The apparatus of claim 3, wherein the reference surge voltage limiter includes a Zener diode connected between the two contacts.

5. The apparatus of claim 1, further comprising a computing unit configured to:
   store surge voltage generation information in response to the output surge voltage detection signal;
   determine whether a count of applied surge voltages that exceed the reference surge voltage is greater than a predetermined number; and
   provide a warning to a user that the applied surge voltage exceeds the reference surge voltage if the count is greater than the predetermined number.

6. A method for detecting surge voltage, the method comprising:
   determining whether an applied surge voltage exceeds a reference surge voltage;
   driving a shunt regulator by generating a driving voltage when the applied surge voltage exceeds the reference surge voltage, a current limiting resistor element serially connected to the shunt regulator between two contacts configured to detect the applied surge voltage; and
   outputting a surge voltage detection signal indicating that the applied surge voltage exceeds the reference surge voltage in response to driving the shunt regulator, the surge voltage detection signal output by a photo coupler connected directly across and in parallel with the current limiting resistor element,
   wherein the driving voltage is generated by a voltage distributor connected in parallel with the shunt regulator.

7. The method of claim 6, further comprising limiting the reference surge voltage by using a Zener diode.

8. The method of claim 6, further comprising:
   storing surge voltage generation information in response to the output-surge voltage detection signal;
   determining whether a count of applied surge voltages that exceed the reference surge voltage is greater than a predetermined number; and
   providing a warning to a user that the applied surge voltage exceeds the reference surge voltage if the count is greater than the predetermined number.

* * * * *